(12) United States Patent
Chae et al.

(10) Patent No.: US 12,035,388 B2
(45) Date of Patent: *Jul. 9, 2024

(54) METHOD BY WHICH D2D TERMINAL FORMS COMMUNICATION LINK WITH COMMUNICATION DEVICE IN WIRELESS COMMUNICATION SYSTEM, AND APPARATUS FOR SAME

(71) Applicant: LG Electronics Inc., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

This patent is subject to a terminal disclaimer.

(21) Appl. No.: 17/544,572

(22) Filed: Dec. 7, 2021

(65) Prior Publication Data

US 2022/0095400 A1    Mar. 24, 2022

Related U.S. Application Data

(63) Continuation of application No. 16/483,110, filed as application No. PCT/KR2018/001826 on Feb. 12, 2018, now Pat. No. 11,229,070.

(Continued)

(51) Int. Cl.
*H04W 4/00*      (2018.01)
*H04W 4/40*      (2018.01)
(Continued)

(52) U.S. Cl.
CPC ............. *H04W 76/14* (2018.02); *H04W 4/40* (2018.02); *H04W 72/02* (2013.01); *H04W 72/52* (2023.01)

(58) Field of Classification Search
CPC ....... H04W 76/14; H04W 4/40; H04W 72/02; H04W 72/52; H04W 4/70; H04W 16/28;
(Continued)

(56) References Cited

U.S. PATENT DOCUMENTS

| 11,229,070 B2* | 1/2022 | Chae .................... H04B 7/0628 |
| 2006/0025150 A1 | 2/2006 | Kim et al. |

(Continued)

FOREIGN PATENT DOCUMENTS

| CN | 103098398 A | 5/2013 |
| JP | 2014527367 A | 10/2014 |

(Continued)

OTHER PUBLICATIONS

Qualcomm Incorporated, "Congestion control for V2V", 3GPP TSG-RAN WG1 #87, Nov. 14-18, 2016, R1-1611594.

(Continued)

*Primary Examiner* — Thai D Hoang
(74) *Attorney, Agent, or Firm* — BRYAN CAVE LEIGHTON PAISNER LLP

(57) ABSTRACT

According to various embodiments, disclosed are a method by which a device-to-device (D2D) terminal (UE) forms a communication link in a wireless communication system, and an apparatus for the same. Disclosed are a method by which a D2D UE forms a communication link in a wireless communication system, and an apparatus for the same, the method comprising the steps of: acquiring load information on the load measured according to beam direction; selecting, on the basis of the load information, any one communication device among at least one communication device corresponding according to beam direction; and forming a communication link with the selected communication device.

13 Claims, 13 Drawing Sheets

Related U.S. Application Data

(60) Provisional application No. 62/457,189, filed on Feb. 10, 2017.

(51) Int. Cl.
*H04W 72/02* (2009.01)
*H04W 72/52* (2023.01)
*H04W 76/14* (2018.01)

(58) Field of Classification Search
CPC ..... H04W 24/08; H04W 72/04; H04W 72/51; H04B 7/0628; H04B 7/063; H04B 7/0632; H04B 7/0452; H04B 7/0695
See application file for complete search history.

(56) References Cited

U.S. PATENT DOCUMENTS

| | | | |
|---|---|---|---|
| 2018/0176845 A1* | 6/2018 | Visuri | H04W 36/0072 |
| 2018/0206218 A1* | 7/2018 | Huang | H04W 16/28 |
| 2018/0213078 A1* | 7/2018 | Visuri | H04W 8/205 |
| 2019/0191334 A1* | 6/2019 | Montsma | H04B 7/18547 |
| 2020/0288432 A1 | 9/2020 | Min | H04W 72/02 |
| 2021/0105661 A1 | 4/2021 | Baghel | H04W 28/0236 |
| 2021/0144570 A1 | 5/2021 | Chae | H04L 5/0053 |

FOREIGN PATENT DOCUMENTS

| | | | |
|---|---|---|---|
| JP | 2016136694 A | 7/2016 | |
| WO | WO-2005060277 A2 | 6/2005 | ............ H04W 36/22 |
| WO | 2005060677 A2 | 7/2005 | |

OTHER PUBLICATIONS

Ericsson, "Congestion Control in V2V", 3GPP TSG-RAN WG2 #95, Aug. 22-26, 2016, R2-165516.

Nec, "Load balancing via dynamic resource sharing for multiple carriers and pools", 3GPP TSG RAN WG1 Meeting #87, Nov. 14-18, 2016, R1-1611722.

LG Electronics, "Discussion on congestion control for PC5-based V2X", 3GPP TSG RAN WG1 Meeting #86bis, Oct. 10-14, 2016, R1-1609187.

Nokia, Alcatel-Lucent Shanghai Bell, "On congestion control for PC5-based V2X", 3GPP TSG-RAN WG1 Meeting #87, Nov. 14-18, 2016, R1-1612883.

Nokia, Alcatel-Lucent Shanghai Bell, "On CBR Measurement", 3GPP TSG-RAN WG1 Meeting #87, Nov. 14-18, 2016, R1-1612884.

Ericsson, "Details about CBR measurement", 3GPP TSG RAN WG1 Meeting #87, Nov. 14-18, 2016, R1-1612933.

* cited by examiner (a)

(b)

(a)

(b)

(A) (B)

METHOD BY WHICH D2D TERMINAL FORMS COMMUNICATION LINK WITH COMMUNICATION DEVICE IN WIRELESS COMMUNICATION SYSTEM, AND APPARATUS FOR SAME

This application is a continuation application of U.S. patent application Ser. No. 16/483,110, filed Aug. 2, 2019, which is a National Stage Entry of International Application No. PCT/KR2018/001826 filed Feb. 12, 2018, which claims the benefit of U.S. Provisional Application No. 62/457,189 filed Feb. 10, 2017, all of which are hereby incorporated by reference in their entirety for all purposes as if fully set forth herein.

TECHNICAL FIELD

The present invention relates to a wireless communication system and, more particularly, to a method of forming a communication link with a communication device by a device-to-device (D2D) user equipment (UE) and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DETAILED DESCRIPTION OF THE INVENTION

Technical Problems

An object of the present invention is to provide a method of forming a communication link by a D2D UE with a communication device, in which the communication device with which the communication link is to be formed is selected based on load information obtained by measuring a congestion degree for each beam direction.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present invention, provided herein is a method of forming a communication link by a device-to-device (D2D) user equipment (UE) in a wireless communication system, including acquiring load information about a load measured for each beam direction; selecting any one communication device from among at least one communication device corresponding to the beam direction, based on the load information; and forming a communication link with the selected communication device.

In an aspect of the present invention, the load may include a value corresponding to at least one of the number of UEs measured in a beam direction, traffic to be transmitted and received, or an interference degree.

In an aspect of the present invention, the UE may measure a channel busy ratio (CBR) indicating an occupancy ratio of a channel corresponding to a beam direction and acquire the load information based on the measured CBR.

In an aspect of the present invention, the CBR is a value of a ratio of resources having measured reception energy higher than a preset first threshold value among all resources included in the channel.

In an aspect of the present invention, the reception energy may be a value calculated as at least one of a received signal strength indicator (RSSI), reference signal received quality (RSRQ), or reference signal received power (RSRP).

In an aspect of the present invention, if reception energy for a reference signal (RS) included in the channel corresponding to the beam direction exceeds a preset second threshold value, the UE may consider the CBR measured for the beam direction as a valid value.

In an aspect of the present invention, if reception energy for a reference signal (RS) included in the channel corresponding to the beam direction is lower than a preset second threshold value, the UE may apply at least one of a preset offset or a weight to the CBR measured for the beam direction.

In an aspect of the present invention, the UE may further consider strength of a signal for the beam direction upon selecting the any one communication device, apply a preset offset or weight to the strength of the signal based on the load information, and select the any one communication device from among the at least one communication device, based on the strength of the signal to which the offset or weight is applied.

In an aspect of the present invention, the UE may not form the communication link with a communication device corresponding to a beam direction having the load above a preset restriction value.

In an aspect of the present invention, the preset restriction value may be differently set according to a priority of a packet to be transmitted by the UE or a priority of a service.

In an aspect of the present invention, the method may further include transmitting a discovery signal including the load information acquired based on the measured CBR.

In an aspect of the present invention, the at least one communication may be at least one base station to which access is performed and the load information may be acquired through a physical broadcast channel (PBCH) and a physical downlink control channel (PDCCH) transmitted by the at least one base station.

In an aspect of the present invention, if the at least one communication device may be at least another D2D UE and the load information may be acquired from a discovery signal of the at least the other D2D UE.

In an aspect of the present invention, the method may further include acquiring a plurality of resource pools allocated for D2D communication by a plurality of base stations, acquiring information about a resource load measured for each of the plural resource pools, and selecting any one resource pool among the plural resource pools based on the resource load.

Advantageous Effects

A method of forming a communication link with a communication device by a D2D UE and an apparatus therefor according to an embodiment of the present invention may minimize occurrence of unnecessary access, unnecessary resource allocation, and a beam scanning procedure by selecting a communication device with which a communication link is to be formed based on load information obtained by measuring a congestion degree for each beam direction.

It will be appreciated by persons skilled in the art that the objects that could be achieved with the present disclosure are not limited to what has been particularly described hereinabove and the above and other objects that the present disclosure could achieve will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
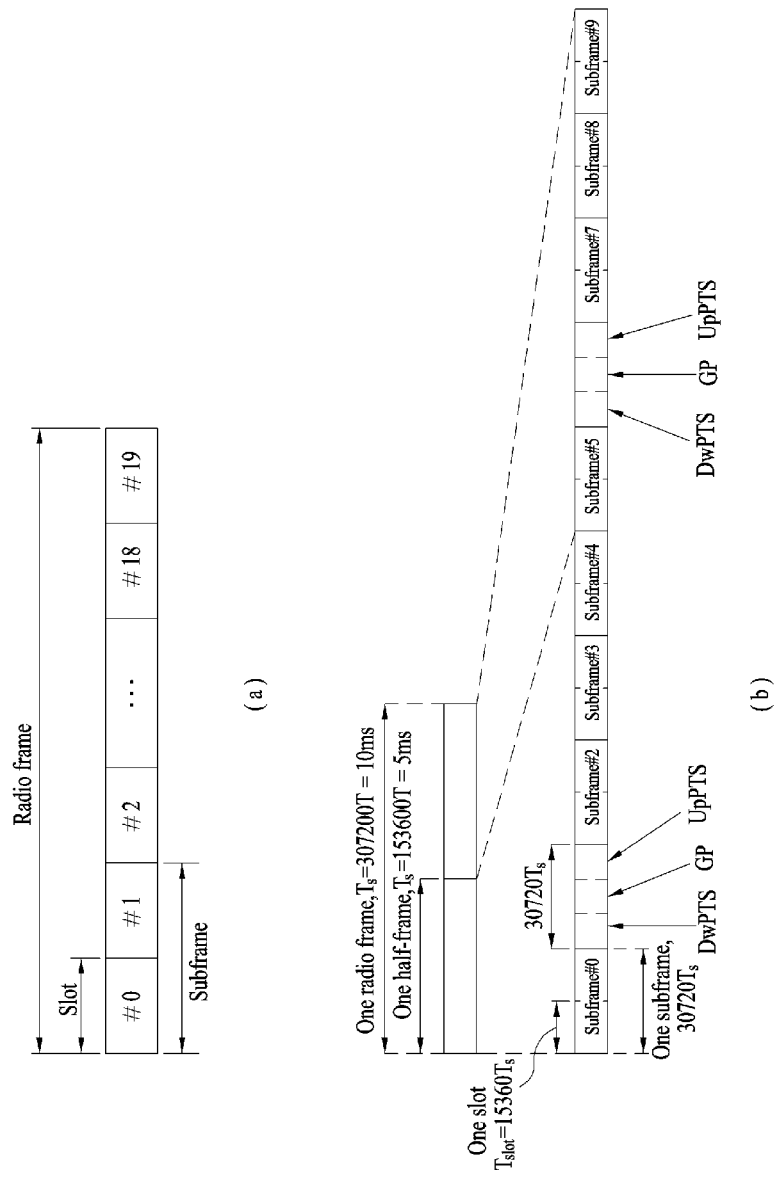
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
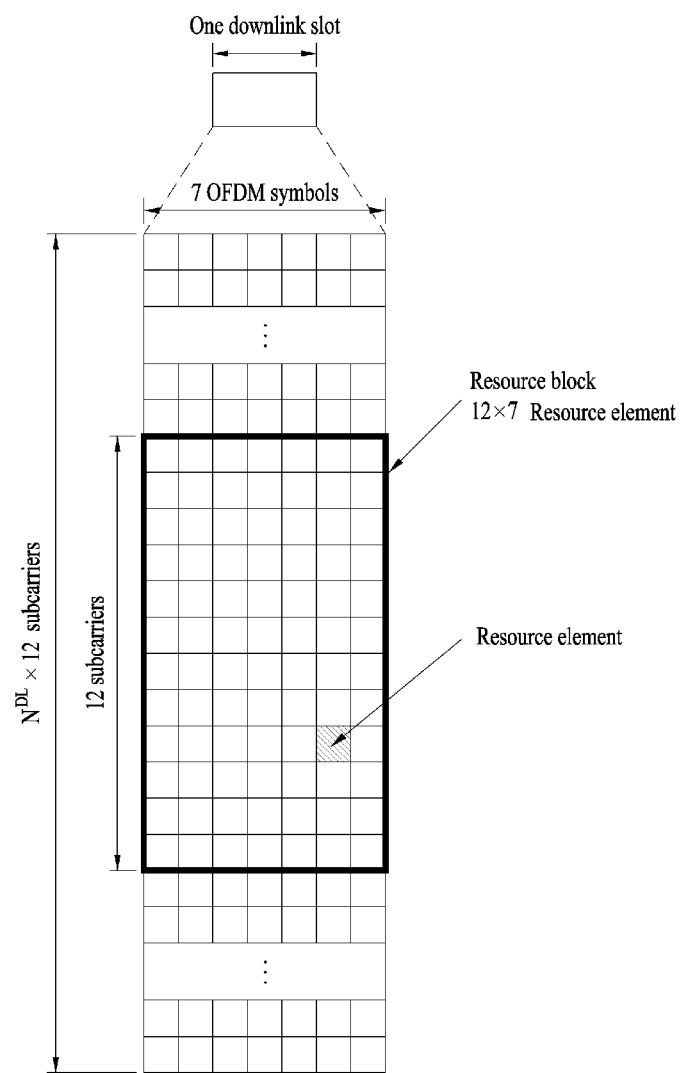
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
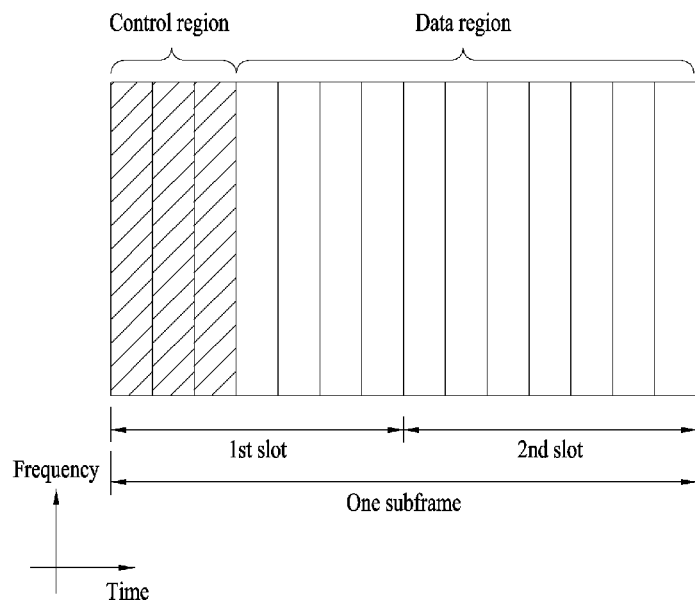
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
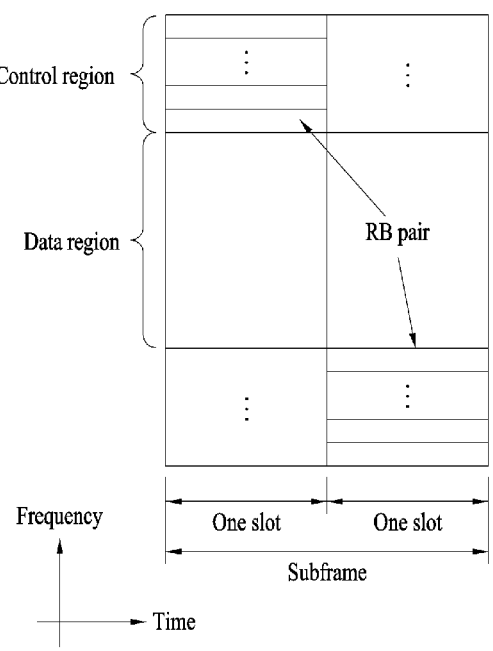
FIG. 4 is a view illustrating the structure of an uplink subframe.

FIG. 4 illustrates the structure of an uplink subframe. An uplink subframe may be divided into a control region and a data region in the frequency domain A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and
ii) Sounding reference signal (SRS) used for an eNB or a network to measure the quality of an uplink channel in a different frequency.

The downlink RSs are categorized into:
i) Cell-specific reference signal (CRS) shared among all UEs of a cell;
ii) UE-specific RS dedicated to a specific UE;
iii) DM-RS used for coherent demodulation of a PDSCH, when the PDSCH is transmitted;
iv) Channel state information-reference signal (CSI-RS) carrying CSI, when downlink DM-RSs are transmitted;
v) Multimedia broadcast single frequency network (MBSFN) RS used for coherent demodulation of a signal transmitted in MBSFN mode; and
vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
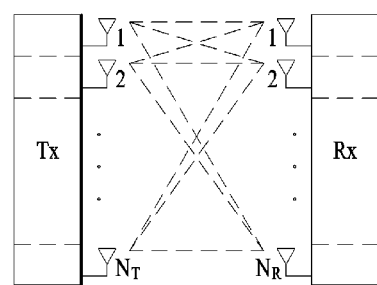
FIG. 5 is a view illustrating the configuration of a wireless communication system having multiple antennas.
Figure 5:
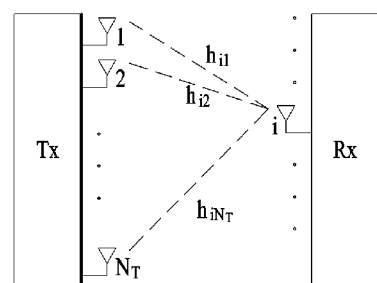

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equaiton 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \cdots, s_{N_T}]^T \quad \text{[Equation 2]}$$

Meanwhile, transmit powers can be set different from each other for individual pieces of transmission information $S_1, S_2, \ldots, S_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \cdots, \hat{s}_{N_T}]^T = [P_1 s_1, P_2 s_2, \cdots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \cdots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \cdots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \cdots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
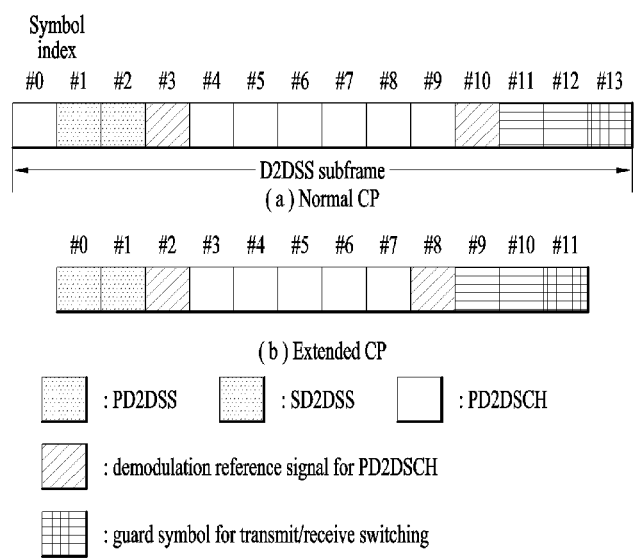
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
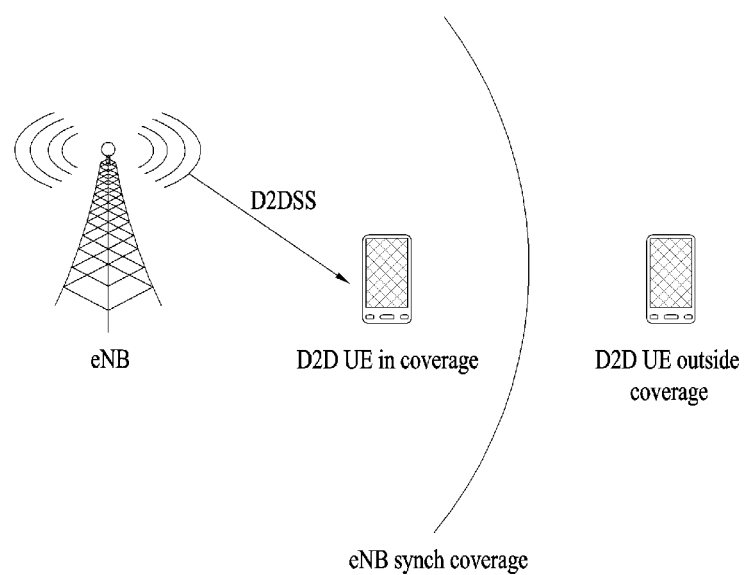
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
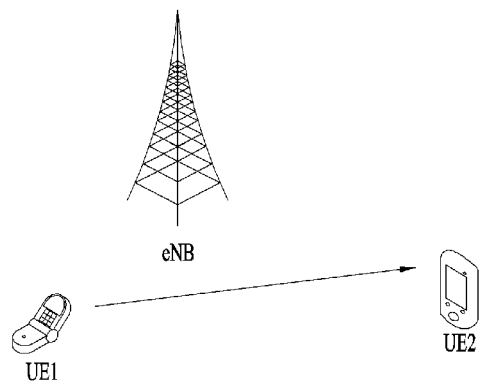
FIG. 8 is a view illustrating an exemplary D2D resource pool for D2D.
Figure 8:
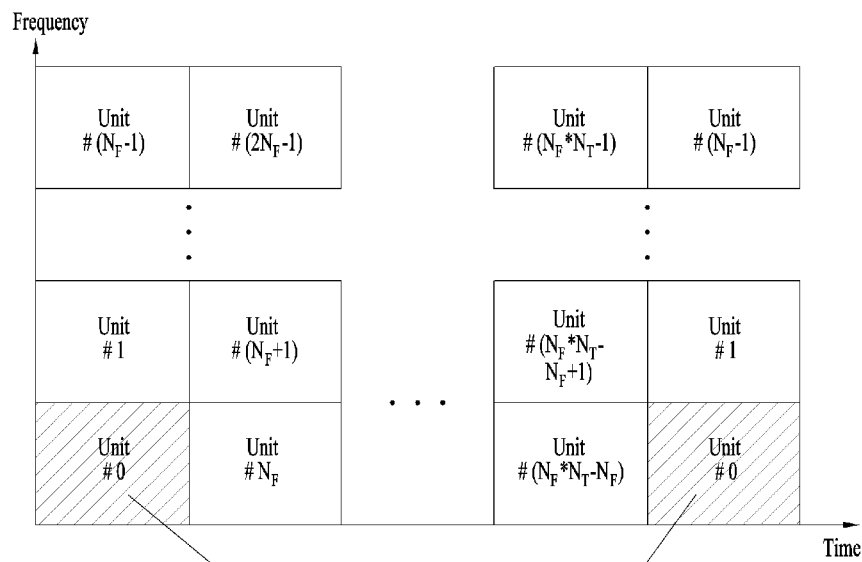

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
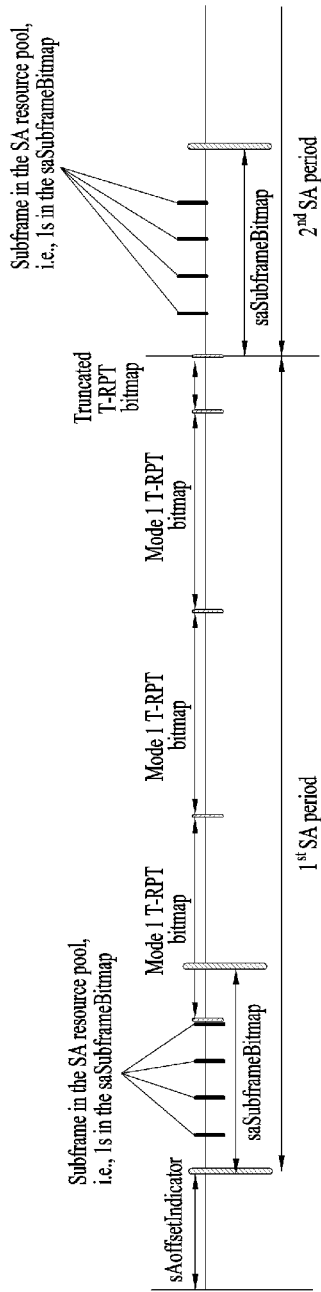
FIG. 9 is a view illustrating a scheduling assignment (SA) period

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

Figure 10:
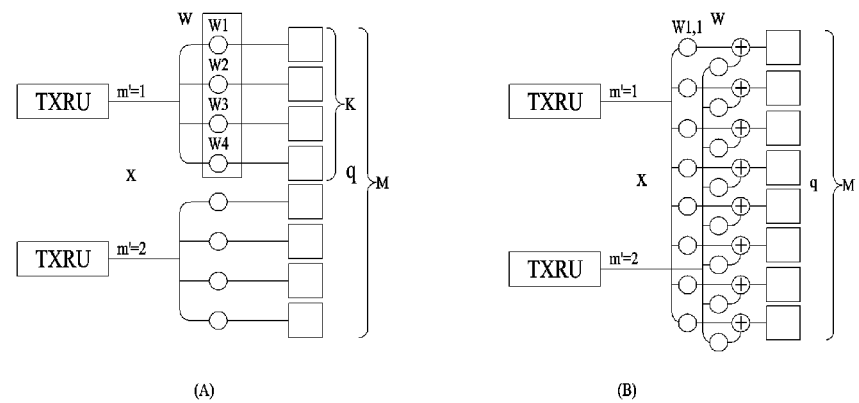
FIG. 10 illustrates examples of a connection scheme between TXRUs and antenna elements.

FIG. 10 illustrates examples of a connection scheme between TXRUs and antenna elements.

FIG. 10(a) illustrates that TXRU is connected to a sub-array. In this case, the antenna elements are connected to only one TXRU. Unlike FIG. 10(a), FIG. 10(b) illustrates that TXRU is connected to all antenna elements. In this case, the antenna elements are connected to all TXRUs. In FIG. 10, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 11:
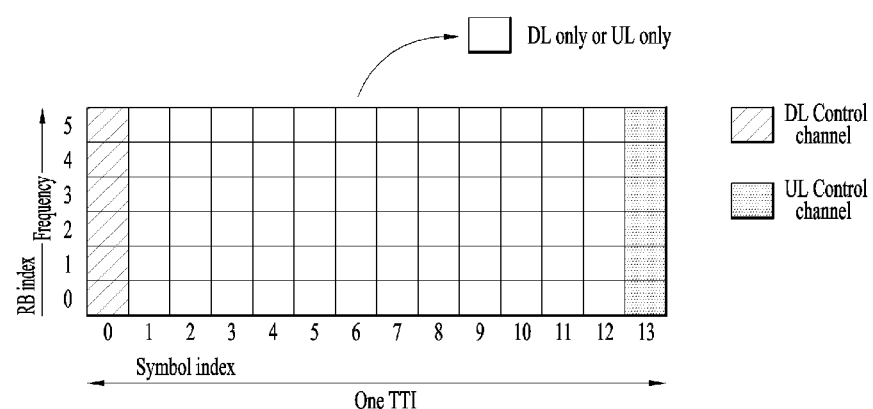
FIG. 11 illustrates an example of a self-contained subframe structure

A self-contained subframe structure shown in FIG. 11 is considered in the fifth generation NewRAT to minimize data transmission latency in a TDD system. FIG. 11 illustrates an example of a self-contained subframe structure.

In FIG. 11, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period In 5G NewRAT, a signal transmissions scheme may differ according to services or requirements. For example, a transmission time unit of enhanced mobile broadband (eMBB) may be relatively long and a transmission time unit of ultra-reliable and low latency communication (URLLC) may be relatively short.

According to a service type, particularly, in the case of an urgent service, a URLLC signal may be transmitted on a corresponding resource even in the middle of eMBB transmission. Accordingly, in terms of a network or a UE, URLLC transmission may consider preemption of a partial transmission resource of eMBB.

In this case, a part of a transmission resource of eMBB having a relatively long transmission time unit may be punctured due to the preemption and an eMBB signal may be modified because the eMBB signal is superimposed on another signal such as the URLLC signal.

When URLLC transmission preempts a partial resource of eMBB transmission, there is a high possibility that the UE fails to decode a specific code block (CB) of eMBB transmission. Particularly, this situation may cause decoding failure for a specific CB even when a channel state is good. Therefore, 5G NewRAT may consider performing retransmission in a CB unit, rather than in a transport block (TB) unit.

Beamforming in mmWave

In millimeter wave (mmW), wavelength is shortened and thus a plurality of antenna elements may be installed in the same area. Specifically, a total of 64 (=8×8) antenna elements may be installed in a panel of 4-by-4 cm in a 30-GHz band with a wavelength of about 1 cm in a 2-dimensional (2D) array at intervals of 0.5λ (wavelength). Therefore, in recent trend of mmW, increasing coverage or throughput by increasing beamforming (BF) gain using multiple antenna elements is taken into consideration.

If a transceiver unit (TXRU) is provided for each antenna element to enable adjustment of transmit power and phase, independent BF may be performed on each frequency resource. However, installing TXRUs in all of about 100 antenna elements is less feasible in terms of cost. Therefore, a method of mapping a plurality of antenna elements to one TXRU and adjusting the direction of a beam using an analog phase shifter is considered. This analog BF method may make only one beam direction in the whole band and thus may not perform frequency selective BF, which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on a connection method of B TXRUs and Q antenna elements.

Directional Load Based Access Control for mmWave Communications

In mmWave, the number of UEs, the amount of traffic to be transmitted or received, and/or the amount of interference (or a congestion degree per direction) may differ according to each direction. For example, when many UEs request to transmit and receive data in a specific direction among a plurality of directions, the case in which an additional communication link cannot be formed in the specific direction may occur. In this case, when UEs in a corresponding area request additional access in the specific direction, unnecessary access, unnecessary resource allocation, and a beam scanning procedure may occur. From this point of view, in mmWave, it is desirable to perform access control considering a "directional load". Then, an unnecessary beam scanning procedure, random access channel (RACH) transmission, and an unnecessary handover operation may be relieved or prevented.

A method of performing initial access control, discovering a target cell and a target UE, and selecting a relay node is proposed by performing access control considering the directional load.

To this end, a gNB, a device (a relay or a UE) desired to perform communication, or a device (a relay/UE/gNB/eNB) desired to perform link setup broadcasts traffic load information to neighboring UEs so that a UE located in a corresponding direction may correctly perform access. Herein, the gNB denotes a new generation eNB and an LTE eNB may also be one gNB.

A scheme of broadcasting information about a load for each direction includes at least one of a scheme of signaling the load information through a broadcast channel such as a physical broadcast channel (PBCH) or through one of fields of a system information block (SIB), a scheme of signaling the load information through a UE common downlink control channel (UE common PDCCH), or a scheme of signaling the load information through a signal transmitted to discover a UE (e.g., a discovery signal).

Figure 12:
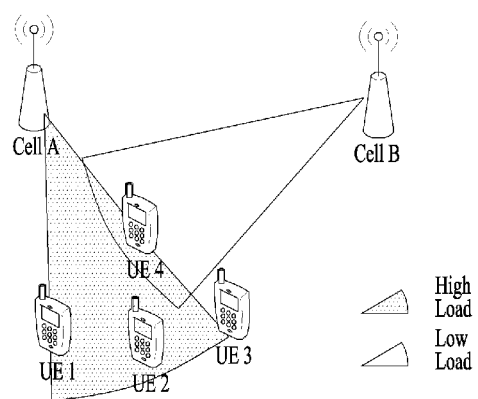
FIG. 12 is a view illustrating a method in which a UE performing D2D communication according to the present invention attempts to access a gNB.

Referring to FIG. 12, a cell A may provide services to UEs clustered in a specific direction. When a fourth UE UE4 attempts to perform new access, if the fourth UE UE4 accesses the cell A simply because the cell A is near thereto (i.e., because a reference signal received power (RSRP) and/or reference signal receiver quality (RSRQ) of the cell A is high), there is a high possibility that the fourth UE UE4 is not provided with a normal service (that the fourth UE UE4 is incapable of receiving data at a desired rate). In this case, although a cell B is farther distant relative to the cell A, if a load in a direction toward the fourth UE UE4 is not high, communication link setup through attempting to access the cell B may be more advantageous to the fourth UE UE4.

As described above, the load information for each direction may be differently applied depending on the priority of a packet to be transmitted by the UE or the class and priority of a service. For example, for a packet or a service having a high priority, the UE may perform access even when a load in a specific direction is above a predetermined load value X. Unlike this, for a packet or a service having low priority, the UE may not perform access if the load in the specific direction is above the predetermined value. An access priority according to such a load may be differently configured according to a packet or a service. Information about the level of an accessible load may be signaled through a physical layer or higher layer signal by a network or may be predetermined.

Specifically, a cell may transmit load information for each beam direction, whereas the cell may monitor a load state and signal barring information as to whether to allow additional access to the UE through the physical layer or higher layer signal. For example, the cell may signal the barring information (or restriction information) for each direction to UEs through the SIB, the PDCCH, or the PBCH. In this case, the barring information (or restriction information) for each beam direction may differ according to an access class. For example, for an emergency service, access may be allowed at any time without restriction of the barring information (or restriction information). For a public safety service, a lower class than the emergency service is assigned to the public safety service and the public safety service may have a lower frequency of access than the emergency service. For this purpose, each cell may monitor the load information for each beam direction and signal different barring information (or restriction information) for each beam direction. For example, for a beam direction A, access may be barred up to a first access class (i.e., access class x) and, for a beam direction B, access may be barred up to a second access class y. Then, the cell may perform independent access control for each direction. The UE may compare the class of a service to be transmitted and received thereby with the barring information (or restriction information) to determine whether the UE may access the cell in a specific direction. Based on the determination result, the UE may attempt to access the cell or select another cell or another beam direction.

Meanwhile, although at least one of a gNB, an access point (AP), a relay, or a specific UE may broadcast the load information about a load for each direction, a UE desired to perform access may directly measure a directional load and reflect the measured result in determining whether to perform access.

For example, the UE may measure a channel occupancy ratio (COR) or a channel busy ratio (CBR) for a specific beam of a specific cell for a predetermined time. In this case, CBR (or COR) indicates an occupancy ratio of a channel for a predetermined time and the channel may be defined as a time unit or may be defined as a frequency resource unit for a predetermined time. For example, the UE may measure an RSSI per subframe for a predetermined time and define the CBR as the ratio of the measured RSSI exceeding a predetermined threshold. Alternatively, a frequency resource unit for a specific time (e.g., x RBs per subframe) may be defined as one channel (or subchannel) and the CBR may be defined as the resource ratio of received energy (RSSI, RSRP or RSRQ) of a (specific) signal measured on this channel, exceeding a predetermined threshold.

The CBR for a specific beam may be measured as being low because a signal does not reach the specific beam at all (e.g., the direction of the beam is opposite to a target UE). In this case, if the UE simply measures the CBR and determines a load, the UE may attempt to perform access in an incorrect beam direction. Therefore, the UE may determine that the load is correctly measured information only when at least one of RSRP or RSRQ is above a predetermined threshold (i.e., when a specific RS signal is received with the predetermined threshold or more) so that measurement of the CBR may be valid measurement. Therefore, the UE may limitedly attempt to perform access only when at least one of RSRP or RSRQ is above the predetermined threshold and the load is below a certain value. Alternatively, upon defining the CBR, the UE may perform access control by modifying the load in a such a manner of assigning a penalty of an offset or scaling (or weight) type to the CBR when RSRP and/or RSRQ is below the predetermined threshold.

Figure 13:
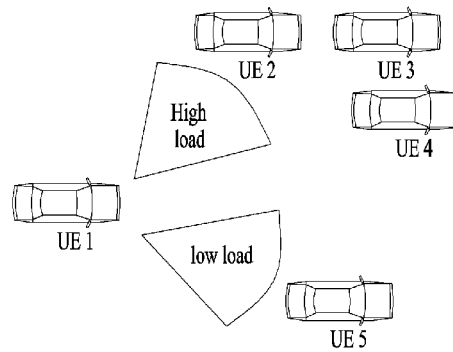
FIG. 13 is a view illustrating a method in which a UE performing D2D communication according to the present invention forms a D2D link with other D2D UEs.

FIG. 13 illustrates an example in which the UE measures directional load. Referring to FIG. 13, each UE may omnidirectionally transmit a specific type of signal (e.g., a discovery signal) at a regular interval in a specific resource region. In this case, a first UE UE1 may measure a CBR for each beam direction. The UE may set a transmission opportunity to be low for a direction having a high CBR and set the transmission opportunity to be high for a direction having a low CBR. Alternatively, if the UE needs to increase the probability that the UE is to be discovered, the UE may set the transmission opportunity to be high for a direction having a high CBR and set the transmission opportunity to be low for a direction having a low CBR. This is because it may be assumed that the higher the CBR is, the more UEs are present in a corresponding direction.

In mmWave, transmission and reception of the discovery signal may be performed in a form different from that described above. For example, an entity for performing BF may be operated in an opposite way. A reception UE has directly measured the directional load in the previous description, whereas a transmission UE may transmit the discovery signal in each direction and the reception UE may perform BF using an omnidirectionally received beam, as another scheme. In both schemes, the UE transmitting the discovery signal should transmit the discovery signal many times by sweeping the direction of a beam or through simple repeated omnidirectional transmission.

Regardless of the load information measured by the UE that desires to perform access (or D2D link) or the load information broadcast by a device to be accessed (e.g., an eNB, a gNB, a relay node, or a UE), the load information may be applied in the form of a function of an offset or scaling (or weight) type to a main metric (e.g., RSRP and/or RSRQ) of the UE that desires to perform access. For example, when attempting to perform access based on RSRP and/or RSRQ of a specific cell, if a corresponding load using the load information is higher than a predetermined threshold, a predetermined offset is applied to the RSRP and/or RSRQ. In this case, an RSRP and/or RSRQ metric to be determined is lowered, thereby making access of the UE less likely to occur. This may be expressed as an equation as follows. When the strength of a signal received from an i-th beam of a cell a is P(a,i), a metric used to determine whether the UE performs access may be represented as P(a,i)-c*L(a,i)*1(L(a,i)>T). Herein, c denotes a coefficient for converting load information to an offset applied to the strength of a received signal and may be set by the network or may be predetermined. 1(L(a,i)>T) denotes a condition function (1 only when the condition is satisfied and 0 otherwise) for applying this bias only when the load exceeds a predetermined threshold T. Lastly, L(a,i) denotes a load for an i-th beam of a cell a and may be measured by the eNB or the UE itself. If the UE measures the load, an index i may be replaced with a direction index of a beam measured by the UE.

The load information may be used to control access and may also be used to configure handover, a packet transmission period, a transmission power, an MCS, and/or the number of repeated transmissions. Alternatively, the load information may be used to transmit a signal desired to discover other UEs, such as a discovery signal. For example, a UE may access a specific cell and, in some cases, the UE may hand over to a new cell because the UE becomes distant from the accessed cell. In this case, load information of a cell and/or load information for each beam direction of a cell may be shared between gNBs through backhaul. A directional load may differ according to a cell to which the UE moves and/or a direction in which the UE moves. A gNB may signal information about a cell to which the UE performs handover together with information about a beam of the cell to the UE or a corresponding gNB (backhaul interface) through a physical layer or higher layer signal, in consideration of the load of the beam located in a direction in which the UE is to move.

A load control scheme according to the load of a cell may also be used to determine a D2D or sidelink resource pool. For example, when a resource pool is configured for each cell, a resource pool actually used by the UE is determined by reflecting the load of each cell. For example, if the load of the resource pool of a cell A is excessively high, the UE uses the resource pool of a cell B even if the UE is located in the coverage of the cell A.

Specifically, the gNB may receive a report including a CBR value for each resource pool and/or information about the location of the UE from the UE and signal or broadcast an average of CBR values or a CBR value per UE location to the UE through the physical layer or higher layer signal. If congestion occurs at the location of the UE or in a cell to which the UE belongs, the UE may use a resource region of another cell. That is, a conventional scheme uses a resource region of a cell on which the UE camps, whereas a proposed scheme may use a resource region of a cell other than a camping cell. For this operation, a metric for determining a resource pool may be represented as m(i)=P(i)-c*L(i). Herein, P(i) is defined as the strength of a received signal from an i-th cell, L(i) is defined as a load measurement value of the i-th cell, and c is defined as a constant that converts a load value into signal strength. If m(a) is greater than m(b), the UE may use the resource pool of a cell A even if the UE camps on a cell B.

gNBs may share the load information of each other using backhaul and each cell may signal the load information of an adjacent cell to the UE through the physical layer or higher layer signal.

Alternatively, the proposed scheme may also be applied to a distributed antenna system. Herein, the scheme of controlling access considering a beam directional load may be applied through modification to a scheme of controlling access considering a load for each distributed antenna. For example, when a cell includes a plurality of distributed antennas or a plurality of APs or remote radio heads (RRHs) is connected via ideal backhaul, if the UE performs access to a specific AP (or RRH), a load for each AP is separately measured and the measured values may be signaled to the UE through the physical layer or higher layer signal. The UE may select an optimal AP considering a load for each AP rather than simply performing access to an AP near the UE or an AP having high quality of a received signal. To this end, the gNB or the UE may separately measure the load for each AP. Although the gNB may naturally measure a load transmitted and received thereby, the UE may measure a CBR indicating how busy a channel for each AP is in order to measure the load for each AP. To this end, each AP may transmit a separate RS or may differently transmit a signal for determining how busy a channel for each AP is.

Even the UE may install a distributed antenna system. For example, a vehicle may be equipped with a distributed antenna for inter-vehicle communication. In this case, the vehicle may measure a separate load for each distributed antenna, perform access control according to the load, set a signal transmission period, and/or set a transmission probability.

The contents of the present invention are not limited to UE-to-UE direct communication and may be used on uplink (UL) or downlink (DL). In this case, the gNB or the relay node may use the above proposed method. In addition, the proposed method is not limited only to a high frequency band such as mmWave and may be extended even to a low frequency band. For example, a beam in mmWave may be applied by being replaced with a precoding matrix indicator (PMI) index in low frequency.

Since examples of the above-described proposed methods may also be included in one of implementation methods of the present invention, it is obvious that the examples are regarded as a sort of proposed methods. Although the above-described proposed methods may be independently implemented, the proposed methods may be implemented in a combined (aggregated) form of a part of the proposed methods. A rule may be defined such that the gNB informs the UE of information as to whether the proposed methods are applied (or information about rules of the proposed methods) through a predefined signal (e.g., the physical layer signal or a higher layer signal).

Figure 14:
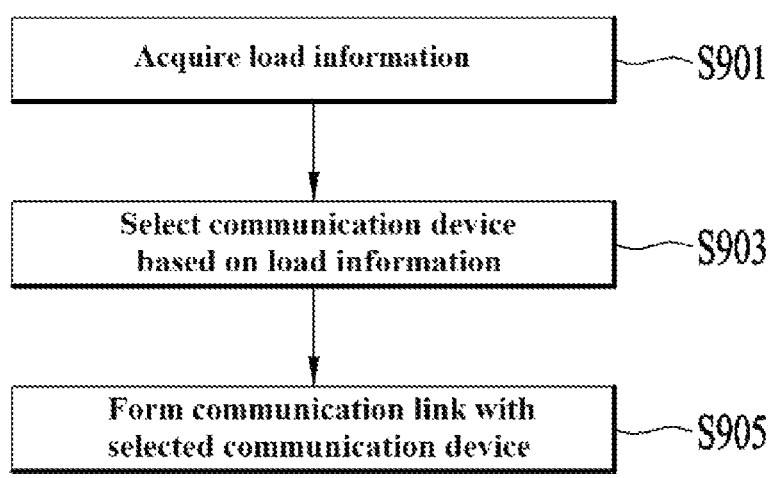
FIG. 14 is a flowchart illustrating a method in which a D2D UE forms a communication link with a communication device according to an embodiment of the present invention.

FIG. 14 is a flowchart illustrating a method in which a D2D UE forms a communication link with a communication device according to an embodiment of the present invention.

Referring to FIG. 14, the UE may acquire load information regarding a load measured for each beam direction. Herein, the beam direction may be a direction for a BF direction of a signal transmitted by another communication device. The load includes information (or a value corresponding to the information) about at least one of the number of UEs for a beam direction, traffic to be transmitted or received, or an interference degree. An entity for measuring the load for each beam direction may be the UE, another UE, or a gNB. The UE may directly measure the load for each beam direction to acquire the load information or receive information about the load measured by another communication device to acquire the load information (S901).

According to an embodiment, the UE may directly measure the load for the beam direction to obtain the load information. The UE may measure a CBR for a channel (a frequency resource unit in a subframe or for a predetermined time) received in each beam direction. The CBR represents an occupancy ratio of a channel for a predetermined time. For example, the UE may measure the strength of a signal per subframe in each beam direction for a predetermined time and measure the CBR, which is a ratio of resources equal to or higher than a preset first threshold value. Herein, the strength of the signal may be a value calculated by at least one of a received signal strength indicator (RSSI), reference signal received quality (RSRQ), or reference signal received power (RSRP). The UE may measure the CBR for a predetermined time in each beam direction of the received signal, measure a load for each beam direction based on the CBR measured in each beam direction, and obtain the load information based on the load for each beam direction.

Alternatively, the UE may impose some restrictions on measurement of the CBR. Specifically, the UE may not reflect, in measurement of the load, the case in which the CBR is measured as being low according to a beam direction transmitted by a communication device opposite to a direction transmitted by the UE. The UE may measure the CBR for each beam direction and determine whether the measured CBR is valid based on the received energy of an RS included in a channel corresponding to the beam direction. Specifically, if energy of an RS included in a channel received in a specific beam direction is lower than a preset second threshold value, the UE may determine that the CBR measured in the specific beam direction is an invalid value. That is, the UE may determine that only the CBR measured in a beam direction in which the energy of the RS is equal to or higher than the preset second threshold value is valid and reflect the measured CBR in the load.

Alternatively, if the energy for the RS included in the channel received in the specific beam direction is lower than the preset second threshold value, the UE may modify the CBR value corresponding to the specific beam direction by applying a preset offset or scaling to the CBR measured in the specific beam direction. The preset first threshold value and the preset second threshold value may be signaled through the physical layer or higher layer signal or may be predetermined Next, the UE may select (or determine) any one of at least one communication device corresponding to each beam direction based on the obtained load information as a communication device for forming a communication link. Herein, the communication device includes a BS (an eNB or a gNB), a relay node, or another UE. The UE may preferentially select a communication device of a beam direction with a low load, based on the load information (S903).

For example, when the communication device is a gNB, the UE may acquire a load for a beam direction corresponding to each of the gNBs from the load information. Upon performing access, the UE may preferentially select a gNB having a load for the beam direction lower than a preset restriction value. In addition, the UE does not select (i.e., does not attempt to access) a gNB located in a beam direction in which the load is equal to or higher than the preset restriction value.

When there are plural gNBs having a load lower than the preset restriction value, the UE may attempt to access any one gNB based on the strength or quality of a signal received from each gNB. Alternatively, the UE may apply an offset or a scaling determined based on the value for the load to a value measured by the strength or quality of the signal. Specifically, the UE may apply the value for the load as a penalty value for lowering the value measured as the strength or quality of the signals. In this case, the UE may select any one gNB to which the UE attempts to perform access based on the strength or quality of a signal to which the penalty is applied according to the load.

In addition, the preset restriction value may be differently determined according to a priority of a packet to be transmitted by the UE or a priority of a service. The preset restriction value according to the priority of the packet or the priority of the service may be signaled through the physical layer or higher layer signal by the network or may be predetermined. The UE may select a communication device located in a beam direction having a load lower than the preset restriction value among at least one communication device, based on the preset restriction value corresponding to a packet to be transmitted and a service type. Alternatively, the preset restriction value may be set to be different according to a priority of a packet and a priority of a service allowed for each beam direction.

Alternatively, when the at least one communication apparatus is a gNB, the UE may acquire the load information regarding a load directly measured for each beam direction by the gNB through a broadcast channel (PBCH) transmitted by the gNB or a control channel (PDCCH) of the physical layer. Herein, the control channel of the physical layer may be a UE common PDCCH. In this case, the UE may attempt to access any one of the at least one gNB based on the load information.

Alternatively, if the at least one communication device is another D2D UE, the UE may acquire the load information measured by the other D2D UE from a discovery signal transmitted by the other D2D UE. In this case, the UE may select a D2D UE with which a D2D link is to be formed, based on the load information obtained from the discovery signal.

The UE may transmit, through the discovery signal, the load information obtained by directly measuring the CBR to the other UE.

Next, the UE may initiate a procedure for forming a communication link with any one communication device selected from among the at least one UE. The UE may form the link with any one communication device through the above procedure (S905).

According to an embodiment, upon forming the communication link with the selected communication device and then performing D2D communication, the UE may select any one of a plurality of resource pools for D2D communication. To this end, the UE may measure a resource load, which is a load for each resource pool. In this case, the UE may acquire the load information by measuring a CBR for each resource pool or acquire the load information from the gNB or another UE. The UE may select a resource pool having a low load among a plurality of resource pools as a resource pool for D2D communication, based on the load information for each resource pool.

Figure 15:
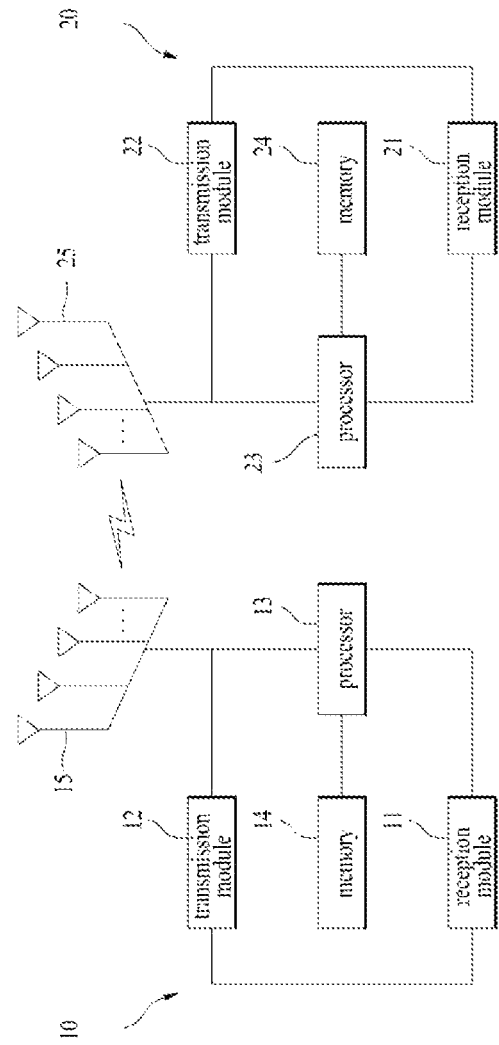
FIG. 15 is a block diagram of a transmission point and a UE according to an embodiment of the present disclosure.

FIG. 15 is a block diagram of a transmission point and a UE according to an embodiment of the present disclosure.

With continued reference to FIG. 15, a UE 20 according to the present disclosure may include a receiver 21, a transmitter 22, a processor 23, a memory 24, and a plurality of antennas 15. Use of the plurality of antennas 25 means that the UE 20 supports MIMO transmission and reception. The receiver 21 may receive various DL signals, data, and information from an eNB. Or/and receiver 21 may transmit a D2D signal (sidelink signal) to the other UE. The transmitter 22 may transmit various UL signals, data, and information to an eNB. Or/and transmitter 22 may transmit a D2D signal (sidelink signal) to the other terminal. The processor 23 may provide overall control to the UE 20.

The processor 23 of the UE 20 according to an embodiment of the present invention can process the necessary items in each of the above-described embodiments.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present invention may be applied independently or implemented such that two or more of the embodiments are applied at the same time. For clarity, redundant description is omitted.

In the example of FIG. 15, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of forming a communication link by a device-to-device (D2D) user equipment (UE) in a wireless communication system, the method comprising:
measuring CBR (channel busy ratio)s for a plurality of beams configured for a D2D communication;
selecting a specific beam from among the plurality of beams based on the CBRs; and
performing the D2D communication with a communication device using the specific beam,
wherein transmission parameters for the D2D communication is determined based on the CBR measured for the specific beam.

2. The method of claim 1, wherein the transmission parameters includes at least one of a packet transmission period, transmission power, modulation and coding scheme, and the number of retransmissions.

3. The method of claim 1, wherein the CBR is a value of a ratio of resources having measured reception energy higher than a preset first threshold value among all resources included in a channel related to the specific beam.

4. The method of claim 3, wherein the reception energy is a value calculated as at least one of a received signal strength indicator (RSSI), and reference signal received quality (RSRQ), or reference signal received power (RSRP).

5. The method of claim 3, wherein, if reception energy for a reference signal (RS) included in the channel exceeds a preconfigured second threshold value, the UE considers the CBR measured for the specific beam as a valid value.

6. The method of claim 3, wherein, if reception energy for a reference signal (RS) included in the channel is lower than a preconfigured second threshold value, the UE applies at least one of a preconfigured offset or a weight to the CBR measured for the specific beam.

7. The method of claim 1, further comprising:
receiving barring information including an access permission service class for each of the plurality of beams.

8. The method of claim 7, wherein the specific beam is a beam measured the CBR below a preconfigured threshold value and having the access permission service class below a service class related to the D2D communication.

9. The method of claim 1, further comprising:
transmitting a discovery signal including the CBR.

10. The method of claim 1, wherein, if the at least one communication is at least one base station, the barring information is acquired through a physical broadcast channel (PBCH) and a physical downlink control channel (PDCCH) transmitted by the at least one base station.

11. The method of claim 1, wherein, if the at least one communication device is at least one D2D UE, the load information is acquired from a discovery signal of the at least one other D2D UE.

12. The method of claim 10, further comprising:
acquiring a plurality of resource pools allocated for the D2D communication by a plurality of base stations;
acquiring information about a resource load measured for each of the plurality of resource pools; and selecting any one resource pool among the plurality of resource pools based on the resource load.

13. A device-to-device (D2D) user equipment (UE) for forming a communication link with a communication device in a wireless communication system, the D2D UE comprising:
 a transceiver; and
 a processor configured to measure CBR (channel busy ratio)s for a plurality of beams configured for a D2D communication, select a specific beam from among the plurality of beams based on the CBRs, and perform the D2D communication with a communication device using the specific beam,
 wherein transmission parameters for the D2D communication is determined based on the CBR measured for the specific beam.

* * * * *